Patented Dec. 3, 1929

1,738,197

UNITED STATES PATENT OFFICE

GÖSTA OSVALD, OF STOCKHOLM, SWEDEN, ASSIGNOR TO WINTHROP CHEMICAL COMPANY, INC., OF NEW YORK, N. Y.

DUST DISINFECTANT

No Drawing. Application filed June 29, 1926, Serial No. 119,432, and in Sweden July 29, 1925.

This invention relates to an improved dust disinfectant adapted for use in disinfecting seed by the dry process, i. e. without the use of disinfecting aqueous solutions.

The dust disinfectants hitherto used are not fully effective in all cases. For instance the dust disinfectants containing mercury compounds as active substance, are fully effective against snow mold (Fusarium) on the most kinds of cereals and have also a good effect against the stinking smut (Tilletia) on wheat, whereas their action against loose and covered smuts of oats and some other diseases of the cereals caused by various parasitic fungi is less satisfactory. The mercury preparations hitherto used have a composition corresponding to a consumption of about 5 grams of mercury on 100 kgs. of seed when they are used in the prescribed manner. A full effect against all usual diseases of the cereals caused by fungi can not be attained without an essential increase of the percentage of mercury over the figure above stated but then the disinfection will be too expensive. On the other hand, the dust disinfectants containing polymeric formaldehyde as active substance show a good effect on the most diseases of the cereals caused by fungi with the exception of Fusarium, its action against the latter being less satisfactory.

The object of this invention is to produce a dust disinfectant which can be manufactured at a low cost and which is effective against all usually occurring smuts on the cereals, inclusive of Fusarium. The dust disinfectant according to this invention contains as active constituents polymeric formaldehyde as well as a mercury compound.

Experiments have proved that Fusarium can be effectively combated by means of a dust disinfectant containing an essentially lower percentage of mercury than the mercury preparations hitherto used. It has been found that it is generally sufficient to use from $\frac{1}{10}$ to $\frac{1}{5}$ of the quantity of mercury hitherto used, i. e. about $\frac{1}{2}$ to 1 gram of mercury to 100 kgs. of seed if the mercury compound is used together with a suitable quantity of polymeric formaldehyde. The latter constituent is then effective against such fungous diseases which cannot be combated effectively with small quantities of mercury. The polymeric formaldehyde is, preferably, used in a quantity corresponding to 5 to 10 grams of polymeric formaldehyde per 100 kgs. of seed. The mercury compound may consist of any of the organic or inorganic mercury compounds which already have been proposed as active constituents of dust disinfectants for seed.

A dust disinfectant according to this invention has besides the advantage of being effective against all usually occurring fungous diseases, also the advantage that it is much less poisonous than other dust disinfectants containing only mercury as active constituents.

As diluting inactive substance I prefer to use finely divided talc but also magnesia, iron oxide or other finely divided substances which are easily mixed with the active substances and have a good adhesion to the seed grains may be used.

Example 1.—30 gr. of paraformaldehyde and 5 gr. of mercurous chloride (Calomel) or 30 gr. of paraformaldehyde and 5 gr. of finely divided mercuric chloride (corrosive sublimate) are intimately mixed with 965 gr. of pulverulent talc.

Example 2.—30 gr. of paraformaldehyde and 7 gr. of mercury salicylate are intimately mixed with 963 gr. of pulverulent talc.

Example 3.—30 gr. of paraformaldehyde and 10 gr. of mercury nitrophenol are intimately mixed with 965 gr. of pulverulent talc.

For the disinfecting of 100 kgs. of seed a quantity of 200 to 300 gr. of any of the above mentioned mixtures is sufficient.

A loss of formaldehyde by the escape of gaseous formaldehyde from the preparation generally occurs when the product is stored. This loss can according to the invention be prevented by an addition of one or more substances which easily combine with formaldehyde. Such substances are for instance starch and starchy substances, dextrin, albumins and albuminous substances, tannins, tannic acid, and so on. The compounds of formaldehyde with said added substances which during storing are formed from the gaseous formaldehyde escaping from the polymeric formaldehyde have practically the same value for the disinfection of the seed as the polymeric formaldehyde inasmuch as also said compounds like the polymeric formaldehyde give off formaldehyde which kills the germs when the disinfected seed has been put into the ground. As an example of the manufacture of such a disinfectant the following may be mentioned: 30 gr. of paraformaldehyde, 50 gr. of wheat-flour and 10 gr. of mercury nitrophenol are intimately mixed with 910 gr. of pulverulent talc.

In manufacturing the disinfectant I can for the polymeric formaldehyde partly or wholly substitute compounds of formaldehyde which are successively decomposed while giving off formaldehyde when subjected to the action of the moisture and the carbonic acid of the soil. Such compounds are for instance compounds of the above-mentioned substances with formaldehyde, viz compounds of formaldehyde and starch or starchy substances, dextrin, albumins and albuminous substances, tannins, tannic acid, and so on. As an example of the manufacture of a disinfectant of such composition the following may be mentioned: 100 gr. of a compound of dextrin and formaldehyde (containing about 30% by weight of formaldehyde) and 10 gr. of mercury nitrophenol are intimately mixed with 890 gr. of pulverulent talc.

For the disinfection of 100 kgs. of seed a quantity of 200 to 300 gr. of any of the above mentioned mixtures is needed.

What I claim is:

1. Dust disinfectant for seed and the like, consisting of a mixture of polymeric formaldehyde, a mercury compound and a pulverulent diluting substance.

2. Dust disinfectant for seed and the like, consisting of a mixture of 2 to 4% by weight of polymeric formaldehyde, a mercury compound in such quantity that the content of metallic mercury of the mixture is about 0.2 to 0.4% by weight, and a pulverulent diluting substance.

3. Dust disinfectant for seed and the like, consisting of a mixture of polymeric formaldehyde, a substance having the property of absorbing gaseous formaldehyde and of combining therewith a mercury compound, and a pulverulent diluting substance.

4. Dust disinfectant for seed and the like, consisting of bodies having the property of giving off formaldehyde when subjected to the moisture and carbonic acid of the soil, a mercury compound, and a pulverulent diluting substance.

In testimony whereof I have signed my name.

GÖSTA OSVALD.